United States Patent [19]

Meyers

[11] 4,152,265
[45] May 1, 1979

[54] FILTER APPARATUS

[75] Inventor: Kenneth A. Meyers, Rockford, Ill.

[73] Assignee: Aqua-Aerobic Systems, Inc., Rockford, Ill.

[21] Appl. No.: 825,937

[22] Filed: Aug. 19, 1977

[51] Int. Cl.² .............................................. B01D 23/24
[52] U.S. Cl. .................................... 210/273; 210/276; 210/292
[58] Field of Search ............... 210/269, 270, 271, 273, 210/275, 276, 280, 292

[56] References Cited

U.S. PATENT DOCUMENTS

| 2,302,449 | 11/1942 | Laughlin | 210/271 X |
| 2,302,450 | 11/1942 | Laughlin | 210/275 X |
| 2,311,594 | 2/1943 | Lose, Jr. | 210/271 X |
| 2,350,160 | 5/1944 | Fraser | 210/271 X |
| 2,442,594 | 6/1948 | Fraser | 210/271 X |
| 3,239,061 | 3/1966 | Horning et al. | 210/276 X |
| 3,395,099 | 7/1968 | Johnson | 210/275 X |

Primary Examiner—Ferris H. Lander
Attorney, Agent, or Firm—Morsbach & pillote

[57] ABSTRACT

A filter apparatus in which a generally horizontal bed of filter material is supported on a porous support and is divided by spaced partitions into individual filter cells above the support and individual filter compartments below the support, and a carriage is mounted for movement along the filter bed and has a collector hood that moves along the top of the bed to collect backwash effluent therefrom and a backwash head arranged to direct backwash fluid into the compartments below the porous support. A pair of spaced scarifier blades are provided in the collector hood to scarify the upper surfaces of the filter bed. The backwash head is advantageously in the form of a jet pump arranged to entrain water from filtrate launder that communicates with the filtrate compartments.

13 Claims, 12 Drawing Figures

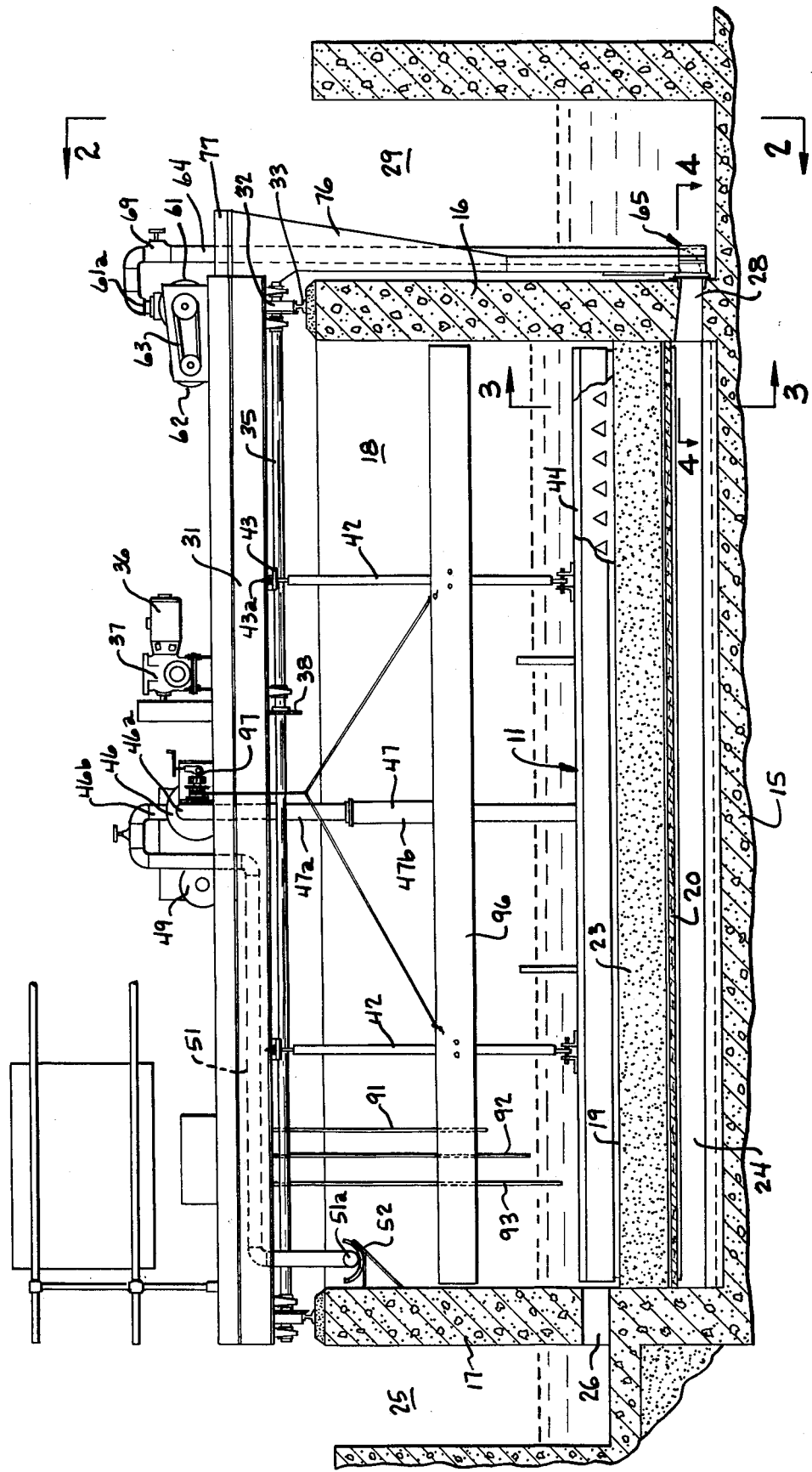

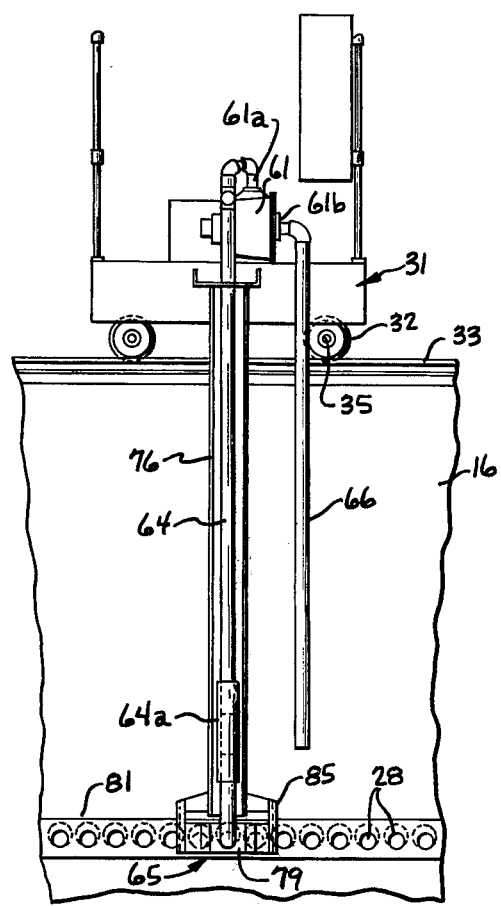
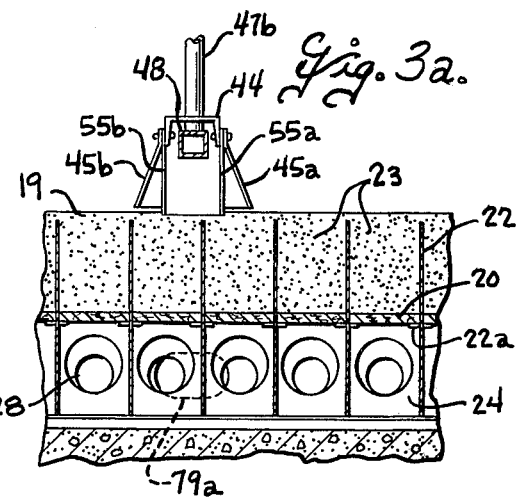
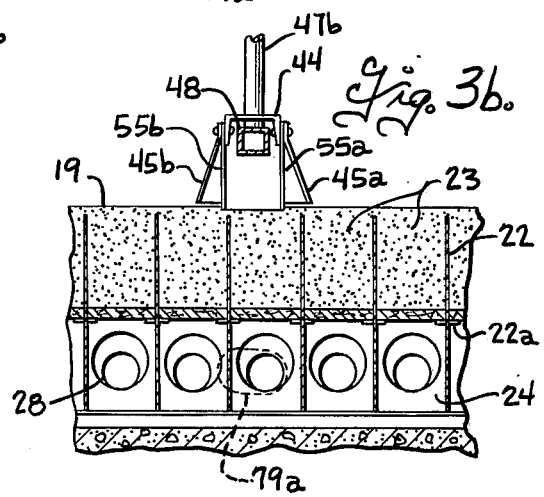
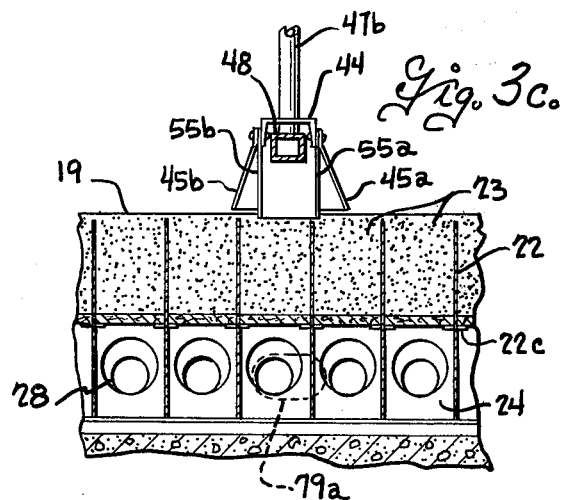

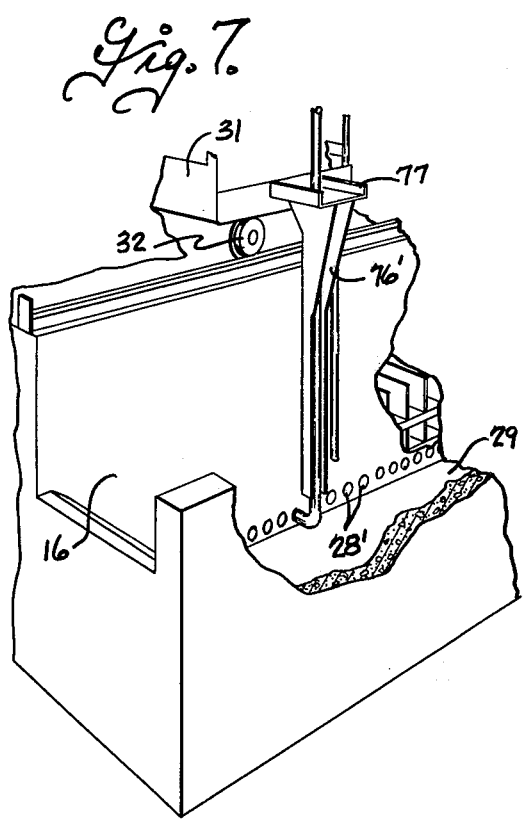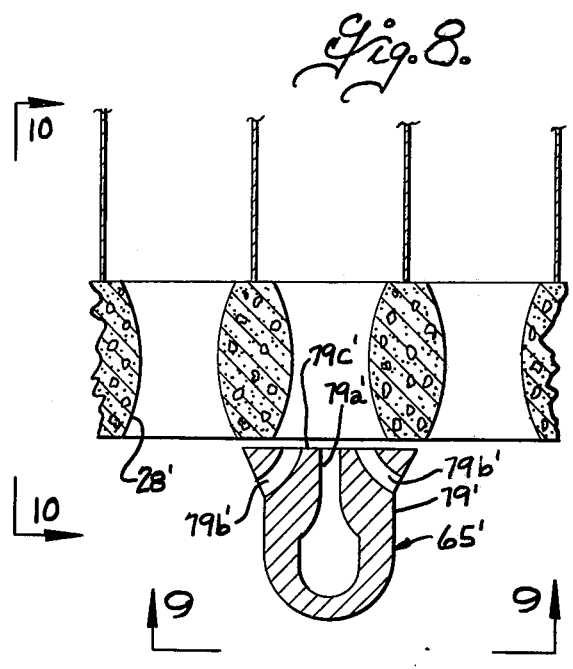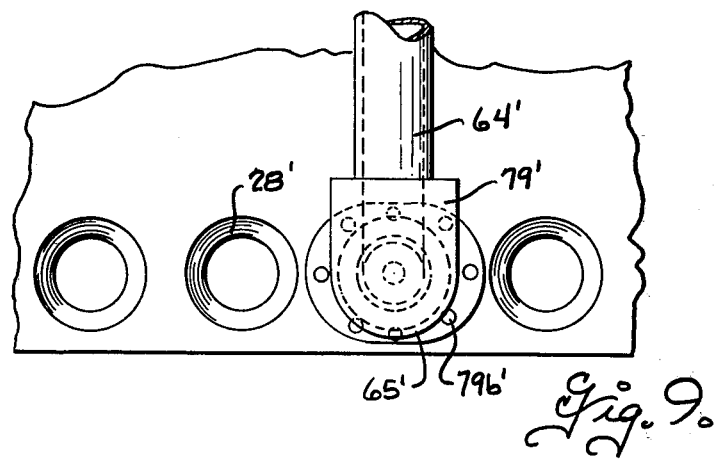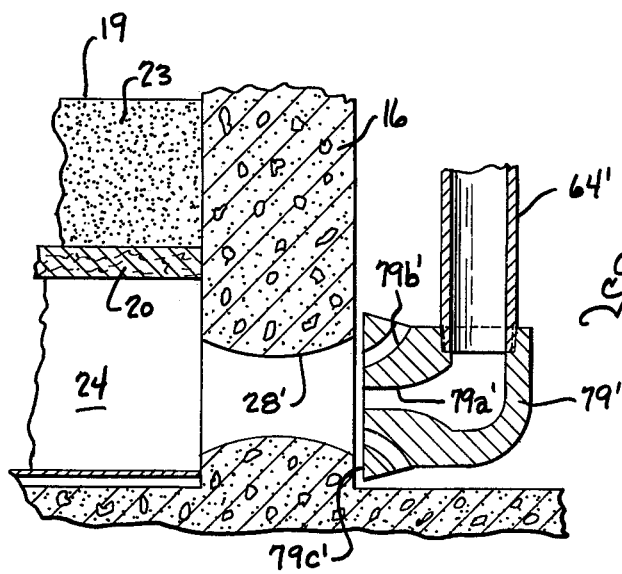

FILTER APPARATUS

BACKGROUND OF THE INVENTION

It has heretofore been proposed, for example as shown in U.S. Pat. Nos. 2,302,449; 2,302,450 and 3,239,061, to make a filter apparatus in which the filter bed is supported on a generally horizontal porous support in a tank and partitions provided at spaced locations along the tank to separate the bed into a plurality of filter cells above the porous support and to divide the space below the porous support into a plurality of filtrate compartments the communicate at one end through a filtrate port with a filtrate launder that extends along the length of the tank. In such filter apparatus, the fluid to be filtered is supplied to the tank above the bed of filter material and passes downwardly through the bed of filter material into the filtrate compartments and out of the filtrate compartments into the filtrate launder to a discharge outlet. The bed of filter material was progressively cleaned by a carriage mounted for movement along the bed and having a backwash apparatus including a backwash head movable through the filtrate launder sequentially into communication with the filtrate ports to supply backwash fluid to the filtrate compartments at the underside of the porous support and a collector hood carried by the carriage and movable along a path over the top of the beds to collect the backwash effluent. The silt and solids that collect on the surface of the filter bed tends to form a relatively dense layer over the top of each filter cell and, when pressured backwash water is introduced under a filter cell, this dense layer on the filter cell can rupture at a location externally of the hood and blow the deposited material back into the fluid to be filtered. In order to aid in dislodging the slit and solids that collect on the surface of the filter bed, it has also been proposed, for example as shown in the aforementioned U.S. Pat. No. 3,239,061, to provide a mechanical agitator or scarifier in the collector hood for loosening the surface of the filter bed. However, the scarifier shown in that patent is located at the centerline of the hood so that it would not function to agitate the material on the surface of the filter cell until some time after the backwash head moved into communication with the cell and supplied pressurized backwash fluid thereto.

In prior filter apparatus of the type shown in the aforementioned U.S. Pat. Nos. 2,302,449; 2,302,450 and 3,239,061 which had a traveling backwash head for introducing backwash fluid under pressure into the filtrate compartments below the porous filter bed support, the backwash head was arranged to slidably engage a guide surface extending along the locus of the filtrate ports to seal the adjacent filtrate ports from the filtrate launder and inhibit leakage of fluid delivered from the backwash pump. The sliding shoe imposed a drag on the carriage and, further, the shoe and the guide surface engaged thereby are subject to wear.

SUMMARY OF THE INVENTION

The present invention relates to filter apparatus of the type in which a bed of filter material is supported on a generally horizontal porous support and a backwash apparatus is moved along the bed to progressively backwash and clean the same. The backwash apparatus includes a collector hood which is movable over the surface of the bed to collect backwash effluent therefrom, and it is an object of the present invention to provide an improved scarifying apparatus in the collector hood for breaking up the surface of the filter bed and removing foreign material as the hood passes thereover.

The backwash apparatus also includes a backwash head arranged to supply backwash fluid under pressure to the underside of the filter bed as the carriage moves therealong and it is another object of the present invention to provide a scarifying apparatus which will inhibit blowing out or rupturing of the surface layer on the filter cell during backwashing at a location external of collector hood.

It is a further object of this invention to overcome the disadvantages of the sliding shoe type backwash head heretofore employed for supplying backwash fluid to the underside of the filter cells by the use of a jet-pump type backwash head.

These, together with other objects and advantages of this invention will be more readily apparent from the following description when taken in connection with the accompanying drawings wherein:

FIG. 1 is a transverse sectional view to one embodiment of a filter apparatus embodying the present invention;

FIG. 2 is a fragmentary sectional view taken on the plane 2—2 of FIG. 1;

FIGS. 3a–3c are fragmentary vertical sectional views taken on the plane 3—3 of FIG. 1 and illustrating the backwash apparatus in different moved positions;

FIG. 7 is a fragmentary perspective view of another embodiment of the present invention;

FIG. 8 is a fragmentary horizontal sectional view taken on the plane 8—8 of FIG. 7 and illustrating the parts on a larger scale;

FIG. 9 is a fragmentary vertical sectional view taken on the plane 9—9 of FIG. 8; and FIG. 10 is a fragmentary vertical sectional view taken on the plane 10—10 of FIG. 8.

Figure 4:
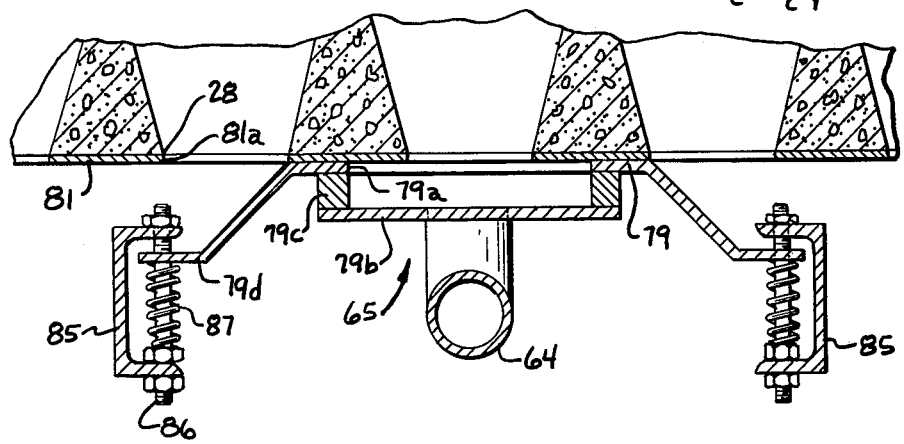
FIG. 4 is a fragmentary horizontal sectional view taken on plane 4—4 of FIG. 1 and illustrating the parts on a larger scale.

The filter apparatus in general includes an elongated tank, conveniently or rectangular configuration and including a bottom wall 15, spaced sidewalls 16 and 17, and end walls 18. A bed of particulate filter material 19 is supported on a generally horizontal porous support 20 in the tank and generally upright partitions 22 extend crosswise of the lower portion of the tank between the sidewalls and separate the bed 19 into filter cells 23 above the porous support 20 and filtrate compartments 24 below the porous support. The porous support is conveniently in the form of porous slabs disposed between the partitions and supported thereon as by brackets 22a. The water or other fluid to be filtered is supplied through an inlet launder 25 (FIG. 1) that extends along one sidewall 17 of the tank and which communicates with the tank through inlet ports 26 at a level above the bed of filter material to supply the fluid to be filtered thereto. The fluid passes downwardly through the filter bed and through the porous support 20 and into the filtrate compartment 24 below the porous support and the filtrate then flows along the compartments 24 crosswise of the tank and through filtrate outlet ports 28 into a filtrate launder 29 (FIG. 1) that extends alongside the other sidewall 16 of the tank.

The filtrate cells 23 are progressively backwashed by a backwash apparatus carried by a bridge or carriage 31 supported by flanged wheels 32 on a track 33 for movement along a generally horizontal carriage path lengthwise of the tank. The wheels 32 are non-rotatably keyed to shafts 35 and at least one of the shafts is driven as by a motor 36 through a speed reducing gear box 37 and chain drive 38, in order to propel the carriage along the tank.

The backwash apparatus includes a collector hood 41 suspended from the carriage 31 as by support rods 42, for movement along a path closely adjacent the upper surface of the filter bed 23. As shown in FIG. 1, the collector hood 41 has a length measured crosswise of the path of travel of the carriage which is only slightly less than the spacing between the sidewalls 16 and 17 of the tank to span the width of the tank, and the hood is attached as by brackets 43 and bolts 43a to the carriage for limited vertical adjustment relative to the carriage to allow positioning of the hood closely adjacent the surface of the bed. As shown in FIGS. 3a–3c, the hood comprises a channel-shaped member 44 and spaced hood members 45a and 45b that extend downwardly from the channel-shaped member and terminate with their lower edges closely adjacent the surface of the bed and spaced apart a distance substantially greater than the spacing of the partitions 22 and preferably of the order of about one and one-half times the spacing of the cell partitions. A waste water pump 46 (FIG. 1) is mounted on the carriage and has its inlet 46a connected through a conduit 47 to the hood 41, the conduit 47 including telescopically adjustable sections 47a and 47b to accommodate vertical adjustment of the hood relative to the carriage. A distributor pipe 48 (FIGS. 3a–3c) is provided in the hood, which distributor pipe is connected to the lower end of the conduit 47 and extends substantially the length of the hood with openings spaced apart therealong to more evenly distribute withdrawal of fluid along the length of the collector hood. The waste water pump 46 is driven as by a motor 49 and has its discharge outlet 46b connected through a discharge pipe 51 which is arranged to have its outlet 51c discharge into a waste water launder 52 that extends the length of the tank. As is conventional, water from the waste water launder 52 flows to a waste water outlet and may be passed to waste or subjected to further treatment if desired.

Figure 5:
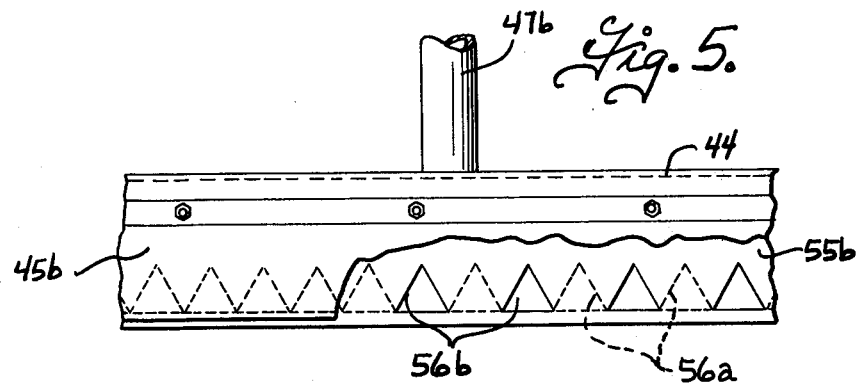
FIG. 5 is a fragmentary side view of the backwash hood.
Figure 6:
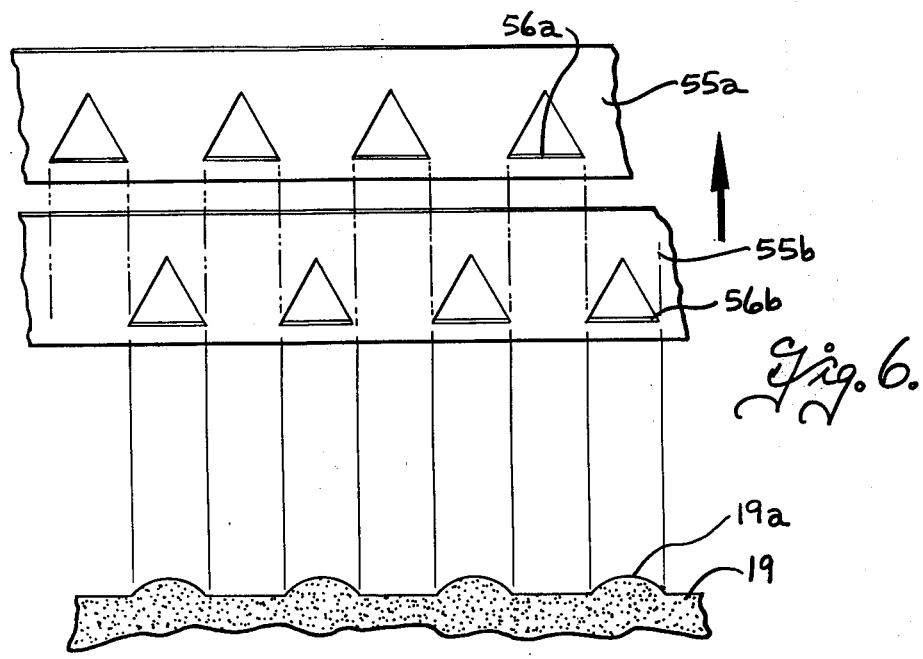
FIG. 6 is a diagrammatic perspective view illustrating the action of the scarifier blades in the backwash hood.

A substantial portion of the material in the fluid being filtered deposits on the surface of the bed and forms a relatively dense mat. Scarifying means are provided in the hood to break up and loosen the mat on the surface of the bed and, in accordance with the present invention, the scarifying means comprises a pair of scarifier blades 55a and 55b which are attached, as by fasteners to the flange portions of the channel member 44 of the collector hood and extend downwardly therefrom to project at least a short distance into the upper surface of the bed during backwashing. The filter bed expands somewhat during backwash and the lower edge of the filter blades extend downwardly a distance sufficient to project into the upper surface of the bed as expanded during backwash. As best shown in FIGS. 5 and 6, the blades 55a and 55b have openings 56a and 56b at spaced locations therealong, which openings are spaced above the lower edge of the respective blade so as to provide a continuous lower edge. The openings are preferably widest adjacent the lower edge of the blades and may, for example, be of triangular configuration as shown in FIGS. 5 and 6. Further, the openings 56a and 56b in the blades 55a and 55b are preferably spaced apart a distance approximating the maximum width of the openings and the blades are arranged so that the openings 56a and 56b are staggered or offset in a direction crosswise of the path of travel of the carriage, as best shown in FIGS. 5 and 6. As the hood moves along the bed, the material on the upper portion of the filter bed is first forced through the openings in the scarifier blade, such as the blade 55a, that leads during movement in one direction of the carriage, will cause the filter material at the surface of the bed to be moved laterally and upwardly through the openings 55a and then through the opening in the trailing one of the scarifier blades. Since the openings 56b in the blade that trails are horizontally offset in a direction crosswise of the carriage from the openings in the lead scarifier blade, the material from the upper portion of the bed is displaced laterally of the path of travel of the carriage hood as it moves through the openings in the leading and trailing scarifier blades and is deposited in shallow furrows at the trailing side of the hood, as indicated at 19a in FIG. 1. The dual scarifier blades thus agitate and loosen the filter material adjacent the surface of the bed as the carriage moves thereover. The scarifier blades are preferably formed so that they are substantially imperforate above the openings and the waste water pump has its inlet conduit 47 arranged to communicate with the hood between the scarifier blades. Thus, some water enters the lower end of the hood outwardly of the scarifier blades and this water passes through the openings 56a and 56b in the scarifier blades to aid in agitating and removing foreign material from the filter bed material as the latter passes through the openings. The scarifier blades are advantageously formed of a resilient and flexible material such as heavy plastic which is adapted to flex laterally and allow the scarifier blades to pass over any obstruction such as the partitions 22. For example, the scarifier blades can be formed of a plastic material such as polypropylene having a sheet thickness of about ⅛" to 3/16". Alternatively, the blades can be formed of a rigid material and rigidly connected as by a flexible strip to the hood to allow lateral swinging of the scarifier blades when they engage an obstruction. As pointed out hereinafter backwash water is introduced into the filter cells below the porous medium and, in order to prevent blow out of the layer of material deposited on the surface of the filter bed externally of the hood when backwash water is introduced into the cell, the scarifier blades are spaced apart a distance such that the scarifier blade that leads during movement of the hood in either direction will enter each filter cell at a carriage position no later than the carriage position at which backwash fluid is introduced at the underside of the filter cell.

The backwash apparatus also includes means for sequentially introducing backwash fluid under pressure into the compartments at the underside of the filter beds as the carriage moves along the tank. This includes a backwash pump 61 mounted on the carriage and driven as by motor 62 and drive 63. The backwash pump 61 has its outlet 61a connected to a delivery conduit 64 to a backwash head 65. It is desirable to use filtered water for backwash in order to avoid contamination and the backwash pump 61 has its inlet 61b connected through a pipe 66 with the filtrate launder 29. In order to control the backwash pressure as adjustable flow control valve 69 is connected in the pump delivery conduit 64 and the rate of flow of fluid through the conduit 64 is controlled as by adjusting the valve 69 to thereby control the backwash flow rate.

The backwash head 65 is attached to the carriage for movement therewith and, as best shown in FIGS. 1, 2 and 4, a rigid arm 76 is attached at its upper end to a bracket 77 connected to the carriage 31 adjacent one end. The arm 76 extends downwardly into the wash water launder 29 to a level adjacent the filtrate ports 28. In this embodiment of FIGS. 1-6, the backwash head is in the form of a shoe 79 adapted to slidably engage a guide plate 81 that extends along the locus of the filtrate ports 28 and which has openings 81a therein each registering with one of the filtrate ports 28. The guide plate 81 can be formed of a wear resistant material such as plastic, wood or the like and the shoe 79 has an elongated opening 79a therein which is adapted to move into and out of registry with the filtrate ports 28. A housing including a plate 79b and a spacer member 79c forms a chamber in the backwash head that communicates with the opening 75a, and the chamber is connected to the backwash delivery conduit 64 to receive fluid therefrom. As shown in FIG. 2, the backwash delivery conduit includes a flexible section 64a to allow limited movement of the distributor head relative to the upper portion of the backwash conduit.

The arm 76 has spaced downwardly extending shoe mounting members 85 at its lower end and which shoe mounting members are spaced apart in a direction paralleling the path of travel of the carriage. A means such as guide pins 86 are attached to the shoe mounting members and extend through offset ear portions 79d on the shoe to support the shoe for movement with the arm 76 and carriage while permitting the limited movement of the shoe in a direction laterally of the guide plate 81. Springs 87 are interposed between the shoe mounting members 85 and the shoe to yieldably urge the shoe into engagement with the guide 81. The filtrate ports are centered relative to their respective filter cell 23 and the center-to-center spacing of the filtrate ports 28 therefore correspond to the width of the filter cells.

The elongated opening 79a in the backwash show has a length substantially greater than the size of the filtrate ports. Preferably, the opening 79a in the backwash shoe has a length corresponding to the center-to-center spacing of the filtrate ports 28, that is to the width of the filter cells 23, and the filtrate ports preferably have a diameter corresponding to one-half the cell width and are spaced apart a distance equal to one-half the cell width. With this arrangement, the elongated opening 79a in the shoe will start to cut off flow to the filtrate port of one cell at about the same time it starts to introduce backwash fluid into the filtrate port associated with the next succeeding cell as shown in FIG. 3a, and, when the opening 79a moves into full communication with the filtrate port in the next succeeding cell, it shuts off communication to the filtrate port of the preceding cell as shown in FIG. 3b. The opening 79a remains in full communication with the filtrate port associated with each cell while the carriage travels a distance approximately equal to one-half the cell width, as shown in FIG. 3c, before it begins to communicate with the filtrate port associated with a succeeding cell. Thus, a full backwash flow is supplied to each cell while the carriage moves a distance corresponding to approximately one-half the cell width and the flow to that cell is thereafter gradually cut off while flow to the next succeeding cell is initiated.

The introduction of backwash fluid under pressure to the undersides of the filter cells could cause the deposited layer or mat on the top of the filter bed to rupture at a location in advance or externally of the collector hood. In order to minimize this problem, the scarifier blades 55a and 55b are positioned with relation with the discharge head so that the scarifier blade that leads during movement of the carriage in either direction, will enter the filter cell at a carriage position no later than the carriage position at which the backwash head starts to introduce backwash fluid to the underside of that cell, as shown in FIG. 3a. Preferably, the blades are spaced apart a distance somewhat less than the width of a filter cell, and for example about three-quarters of the width of the filter cell. It will further be seen that the scarifier blade that leads during movement of the carriage in either direction will pass completely through the filter cell before the carriage reaches a position at which a discharge head moves out of full communication with the opening 81a, as shown in FIG. 3c. This assures that scarifying of the upper surface of the cell will be completed before full backwash flow to that cell has been terminated.

A modified form of backwash head is illustrated in the embodiment of FIGS. 7-10. The sliding shoe type head of the preceding embodiment does impose a drag on the carriage and is subject to wear both on the shoe and the guide plate 81. In the embodiment of FIGS. 7-10, the backwash head designated 65' is in the form of a jet pump mounted on the depending arm 76' for movement with the carriage. The jet pump comprises a jet pump body 79' having a jet nozzle 79a' connected through a conduit 64' to the outlet of the backwash pump 61. The pump and nozzle are constructed and arranged to direct a high velocity jet of backwash fluid such as water into each of the filtrate ports 28' when the discharge head moves into juxtaposition therewith, and the jet pump body is constructed and arranged to define an eductor inlet 79b' between the jet nozzle 79a' and the adjacent filtrate port, which eductor inlet communicates with the filtrate launder so that the jet of water from the jet nozzle entrains water from the filtrate launder and delivers the same into the filtrate compartment 24. The eductor inlet can be an open space between the jet pump body 79' and the juxtaposed filtrate port to allow water from the filtrate launder to enter around the jet from nozzle 79a. However, the jet pump body is preferably formed with an end face 79c' that extends closely adjacent the locus of the filtrate ports 28' and the eductor inlets 79b' are preferably formed as passages in the jet pump body around the jet nozzle, with the passages shaped to guide water from the filtrate launder along paths that converge smoothly with the jet from the nozzle 79a'. The jet pump body does not have to be disposed in sliding contact with the filtrate port and is instead preferably spaced slightly therefrom so as to avoid frictional contact with the filtrate ports. The velocity head of the jet nozzle entrains water from the filtrate launder and pumps the same into the filtrate compartment below the filter bed and, as the jet from nozzle 79a' expands and slows down, the velocity head is converted to a pressure head at the underside of the filter bed to pressurize the backwash fluid thereat. As shown in FIGS. 8 and 10, the filtrate ports 28' are preferably contoured to form a jet diffuser which expands in a direction toward the filtrate compartment.

The carriage 31 is driven by motor 36 along the length of the tank and means (not shown) is provided for reversing the motor drive at each end of the tank to reverse the direction of movement of the carriage. The carriage can be operated in continuous fashion from one end of the tank to the other, or it can be operated intermittently under the control of a timer or under the control of mechanism responsive to the condition of the bed, or both. For example, it is common practice to provide a means such as a liquid level sensing probe indicated at 91 in FIG. 1 which senses when the bed is contaminated to a predetermined degree, as indicated by a predetermined rise in the liquid level of the tank, to start the travel of the backwash carriage and operation of the backwashing apparatus, with a second liquid level sensing probe 92 arranged to sense when the bed has been cleaned to the desired degree, as indicated by a drop in the liquid level in the tank. A third probe 93 is provided to sense if the liquid level has dropped to an excessively low level and to operate apparatus to shut off the backwashing under that condition. If it is desired to stop the carriage at a predetermined point along the tank, additional controls can be provided for this purpose. In addition, a skimmer 96 can be mounted on the carriage as best shown in FIG. 1 for movement with the carriage and to convey floating material such as oil, leaves and the like to a waste launder (not shown) adjacent one end of the tank. As shown in FIG. 1, the skimmer is conveniently guided on the rods 42 and is selectively adjustable as by a winch 97.

The embodiments of the invention in which an exclusive property or privilege is claimed are defined as follows:

1. In a filter apparatus of the type including a tank having horizontal bed of filter material therein, means for supplying fluid to be filtered to the tank above the bed of filter material, and filtrate receiving means communicating with the underside of said bed of filter material, a carriage movable along a carriage path over the tank, a downwardly opening collector hood carried by said carriage for movement therewith along a path adjacent the top of said filter bed, effluent pump means connected to said collector hood for pumping effluent therefrom, and scarifying means in said hood for scarifying the upper surface of the filter bed, the improvement wherein said scarifying means comprises first and second generally upright scarifier blades extending crosswise of the path of travel of the carriage and spaced apart therealong, said blades having openings therethrough at spaced locations therealong and spaced above the lower edge thereof to provide a continuous lower edge adapted to extend below the upper surface of the filter bed whereby material from the upper portion of the filter bed is first forced through the openings in the leading one of said scarifier blades and then through the openings in the trailing one of said scarifier blades as the hood moves along the bed, the openings in said first and second scarifier blades being horizontally offset in a direction crosswise of the carriage path whereby the material from the upper portion of the bed is displaced laterally of the path of travel of the hood as it moves over the bed.

2. A filter apparatus according to claim 1 wherein said scarifier blades are attached adjacent their upper edges to said collector hood and extend downwardly therefrom, the portions of said blades above said openings being substantially imperforate.

3. A filter apparatus according to claim 1 wherein said scarifier blades are attached adjacent their upper edges to the collector hood and extend downwardly therefrom, at least a portion of said scarifier blades being resiliently yieldable in the direction of movement of the hood to allow the scarifier blades to pass over obstructions.

4. A filter apparatus according to claim 1 wherein said scarifier blades are attached adjacent their upper edges to the collector hood and extend downwardly therefrom, said blades each being formed of a resiliently yieldable material to allow the blades to flex and pass over obstructions.

5. A filter apparatus according to claim 1 wherein said effluent pump means communicates with said hood at a location between said first and second scarifier blades.

6. A filter apparatus according to claim 1 wherein said scarifier blades are attached adjacent their upper edges to the collector hood and extend downwardly therefrom, the portions of said blades above said openings being substantially imperforate, said effluent pump means communicaing with said hood at a location between said first and second scarifier blades.

7. In a filtering apparatus of the type including a tank, a carriage movable along a carriage path over the tank, porous means defining a filter bed support having a bed of filter material thereon, a plurality of partitions extending transverse to the carriage path and spaced apart therealong separating the bed into a plurality of open top filter cells above the porous means and defining a plurality of fluid receiving compartments below the porous means each individual to a respective one of the filter cells, a plurality of filtrate ports spaced apart along a port locus paralleling said carriage path with each filtrate port communicating with a respective one of the fluid receiving compartments, a filtered effluent launder extending along said port locus and communicating with said filtrate ports, backwash means carried by said carriage and including a backwash pump and a backwash head movable along a path paralleling said port locus sequentially into communication with each of said filtrate ports to supply backwash fluid thereto, a collector hood carried by said carriage for movement therewith along a path adjacent the upper surface of the bed, effluent pump means connected to the collector hood for pumping effluent therefrom, and scarifier means in the collector hood for scarifying the upper surface of the bed as the carriage moves therealong, the improvement wherein said scarifying means comprises first and second generally upright blades extending crosswise of the path of travel of the carriage internally of the collector hood and spaced apart therealong, said blades having openings therethrough at spaced locations therealong whereby material from the upper portion of the filter bed is first forced through openings in the leading one of said scarifier blades and then through the openings in the trailing one of said scarifier blades as the hood moves along the bed, said collector hood having a width measured in a direction paralleling the carriage path which is substantially greater than the width of each filter cell, said scarifier blades being spaced apart a distance no greater than the width of a filter cell, and said effluent pump means communicates with the hood intermediate said first and second scarifier blades.

8. A filtering apparatus according to claim 7 wherein the openings in the first and second scarifier blades are horizontally offset in a direction crosswise of the carriage path whereby material from the upper portion of the bed is displaced laterally of the path of travel of the hood as it moves over the bed.

9. A filter apparatus according to claim 8 wherein said openings in said scarifier blades are spaced above the lower edge thereof and spaced apart therealong.

10. A filter apparatus according to claim 7 wherein said first and second scarifier blades are located in relation to said backwash head such that the scarifier blade that leads during movement of the hood in either direction will enter each filter cell at a carriage position no later than the carriage position at which the backwash head moves into communication with the filtrate port associated with that cell.

11. In a filtering apparatus of the type including a tank, a carriage movable along a carriage path over the tank, means defining a filter bed support having a bed of filter material thereon, means defining a plurality of generally horizontal fluid receiving compartments at the underside of the filter bed extending transverse to the carriage path and spaced apart therealong, a plurality of filtrate ports spaced apart along a port locus paralleling said carriage path with each filtrate port communicating with a respective one of the fluid receiving compartments at one end thereof, a filtered effluent launder extending along said port locus and communicating with said filtrate ports, backwash means carried by said carriage and including a backwash pump and a backwash head movable along a path paralleling said port locus sequentially into juxtaposition with each of said filtrate ports to supply backwash fluid thereto, a collector hood carried by the carriage for movement therewith along a path adjacent the upper surface of the bed, and effluent pump means communicating with the hood for pumping effluent therefrom, the improvement wherein said backwash head comprises a jet pump body having a jet nozzle connected to said backwash pump means and operative to direct a high velocity jet of water into each filtrate port when the discharge head moves into juxtaposition thereto, the jet pump body being constructed and arranged to define an eductor inlet between the jet nozzle and the juxtaposed filtrate port, which eductor inlet communicates with the filtrate launder, whereby the jet of water from the jet nozzle entrains water from the filtrate launder.

12. The combination of claim 11 including means defining a jet diffuser intermediate the filtrate ports and the respective fluid receiving compartment.

13. In a filtering apparatus of the type including a tank, a carriage movable along a carriage path over the tank, porous means defining a filter bed support having a bed of filter material thereon, a plurality of partitions extending transverse to the carriage path and spaced apart therealong separating the bed into a plurality of open top filter cells above the porous means and defining a plurality of fluid receiving compartments below the porous means each individual to a respective one of the filter cells, a plurality of filtrate ports spaced apart along a port locus paralleling said carriage path with each filtrate port communicating with a respective one of the fluid receiving compartments, a filtered effluent launder extending along said port locus and communicating with said filtrate ports, backwash means carried by said carriage and including a backwash pump and a backwash head movable along a path paralleling said port locus sequentially into juxtaposition with each of said filtrate ports to supply backwash fluid thereto, a collector hood carried by said carriage for movement therewith along a path adjacent the upper surface of the bed, effluent pump means connected to the collector hood for pumping effluent therefrom, and scarifier means in the collector hood for scarifying the upper surface of the bed as the carriage moves therealong, the improvement wherein said backwash head comprises a jet pump body having a jet nozzle connected to said backwash pump means and operative to direct a high velocity jet of water into each filtrate port when the discharge head moves into juxtaposition thereto, the jet pump body being movable along a path adjacent to but out of physical contact with the locus of the filtrate ports and being constructed and arranged to define an eductor inlet between the jet nozzle and the juxtaposed filtrate port, which eductor inlet communicates with the filtrate launder, whereby the jet of water from the jet nozzle entrains water from the filtrate launder.

* * * * *